Sept. 6, 1966 D. E. HEWES ET AL 3,270,441
REDUCED GRAVITY SIMULATOR
Filed Aug. 26, 1963 4 Sheets-Sheet 1

INVENTORS
DONALD E. HEWES
AMOS A. SPADY, JR.

BY
ATTORNEYS

Sept. 6, 1966 D. E. HEWES ET AL 3,270,441
REDUCED GRAVITY SIMULATOR

Filed Aug. 26, 1963 4 Sheets-Sheet 2

INVENTORS
DONALD E. HEWES
AMOS A. SPADY, JR.

BY

ATTORNEYS

INVENTORS
DONALD E. HEWES
AMOS A. SPADY, JR.

Sept. 6, 1966   D. E. HEWES ET AL   3,270,441
REDUCED GRAVITY SIMULATOR
Filed Aug. 26, 1963   4 Sheets-Sheet 4

INVENTORS
DONALD E. HEWES
AMOS A. SPADY, JR.

BY
ATTORNEYS 3,270,441
REDUCED GRAVITY SIMULATOR
Donald E. Hewes, Newport News, and Amos A. Spady, Jr., Hampton, Va., assignors to the United States of America as represented by the Administrator of the National Aeronautics and Space Administration
Filed Aug. 26, 1963, Ser. No. 304,749
14 Claims. (Cl. 35—29)

The invention described herein may be manufactured and used by or for the Government of the United States of America for governmental purposes without the payment of any royalties thereon or therefor.

This invention relates generally to a reduced gravity simulator system, and more particularly to a practical system for simulating reduced and zero-gravitational fields, such as will be encountered in space stations and various celestial bodies, for determining the effects on the self-locomotive capabilities of man when subjected to a gravitational field less than that of the Earth for a sustained period of time.

One of the primary unknowns of future space exploration is believed to be the effect of sustained zero gravity or weightlessness experienced by the explorers during orbital flight about the Earth and in certain phases of interplanetary travel. In addition, the knowledge that the Moon has a reduced gravitational field equal approximately one-sixth to that of the Earth, and the knowledge that reduced gravity, as well as zero gravity or weightless conditions, for sustained periods of time will be experienced by explorers during space exploration, creates a definite need for a suitable reduced gravity simulation technique for studies on Earth of man's ability to perform needed self-locomotive tasks during interplanetary exploration. Lack of a suitable device for simulating the lunar gravity is considered to be a major cause of the current lack of information on the ability of the proposed lunar explorers to perform various self-locomotive tasks such as walking, running, and jumping.

Upon the successful completion of the presently planned initial lunar landing, it is expected that the astronauts will leave their vehicle to make scientific measurements, to explore the lunar features, such as known craters and possible caves, to inspect their vehicle, and to prepare it for the return trip to Earth. It is also anticipated that subsequent missions will require astronauts to erect lunar bases with permanent housing facilities for future explorers. Because the lunar environment is considerably different from that of Earth, the explorers will have to adjust their accustomed methods of self-locomotion to that of the lunar gravitational environment in order to accomplish the mission objectives.

In addition to the low gravitational field of the lunar surface, another condition which may present problems in self-locomotion on the lunar surface is the requirement of wearing space suits whenever venturing out of the spacecraft or lunar base due to the lack of an atmosphere and the need for protection from lunar temperatures and possible micrometeor and solar radiation showers. The presently available types of space suits that will provide this required protection are quite bulky and cumbersome and obviously impose some limitation on the self-locomotion capabilities of the explorers under Earth gravity. Thus, the need also exits for a system whereby the self-locomotive ability of future interplanetary space suit attired explorers can be observed under sustained reduced gravitational conditions.

Based on these needs, the present invention of a new type reduced gravitational simulation system and technique has been developed. As a result of the present invention, it can now be predicted that when man arrives on the Moon, he not only will definitely be able to walk and run on the Moon's surface and be able to jump vertical distances of 12 to 14 feet without sustaining injury in falls from these distances, he also will have little difficulty in climbing slopes, stairs, ladders and the like, as well as having little difficulty in performing other manual tasks while unencumbered with a space suit. Additional tests can be made to establish his capabilities while wearing various types of space suits.

Previous techniques used to simulate reduced and zero-gravitational conditions include water immersion of the test subject where the buoyant forces of the water oppose the gravitational force to produce an approximate condition of weightlessness. This technique has the obvious disadvantages of requiring special underwater breathing equipment, being limited to only a very approximate simulation of weightlessness, and of producing extraneous forces on the subject due to the undesirable mass and viscous effects of the water, that restrict the movement of the test subject.

Another simulation of weightlessness has been by the use of an airplane flying a Keplerian ballistic trajectory or a slightly modified one to produce centrifugal forces which directly oppose gravitational force and thereby produce any desired condition of weightlessness or near weightlessness. This technique has the disadvantages of producing the desired test condition for only a short period of time, and of providing a very limited space in which the subject can move. In addition, an airplane flying this trajectory is subject to disturbing forces, due to atmospheric turbulence and during the entry and terminal maneuvers to the trajectory, as well as being relatively expensive, in time and money, to operate.

The most recent studies of weightlessness and zero-gravitational effects on a test subject in this country have been observed during the orbital flights of the Mercury capsule. Although this expensive study has provided invaluable information as to the effect of zero-gravitational conditions or weightlessness on an astronaut for a reasonable period of time, it nevertheless has been impossible under this program to observe or test the self-locomotive capabilities of the astronaut due to the limited passenger compartment size in the Mercury capsule. In addition, tests under fractional gravitation conditions obviously could not be conducted under this program.

An additional system embodying a vertical cable suspension wherein the test subject is partially supported by a cable or series of overhead cables which produce vertical forces opposing the gravitational force to produce any desired condition of weightlessness or near weightlessness has also been employed in some test procedures. This technique has the obvious disadvantages of applying the opposing force at only limited points on the body so that some external members of the body are not subjected to the simulated gravity conditions, of requiring a somewhat complicated mechanical setup to accommodate the space requirements for the subject's movements, and of limiting the number of tasks that can be performed due to the interference of the overhead cables. The limitations of these prior simulation techniques has led to the development of the present invention which minimizes the disadvantages of the prior art simulation techniques while utilizing the advantageous features therein.

Accordingly, it is an object of the present invention to provide a new and improved reduced gravitational simulator for a test subject capable of operation for indefinite periods of time.

Another object of the instant invention is the provision of a new and improved reduced gravity simulator capable of accurately simulating gravitational fields less than that of the Earth.

A further object of the present invention is the provision of a reduced gravity simulator for testing the self-maneuverability of a test subject under reduced gravitational conditions.

Still another object of the instant invention is a novel method of simulating gravitational fields less than that of the Earth for testing the locomotion capabilities of a test subject when wearing space suits or like equipment.

Another object of the present invention is a method of simulating the lunar gravitational field on a test subject on Earth by effectively canceling five-sixths of the Earth's gravitational force acting on the test subject.

An additional object of the present invention is a reduced gravity simulator providing essentially unlimited duration of the test condition with adequate space for test subject movement.

According to the present invention, the foregoing and other objects are attained by providing a system for supporting the individual external body members or groups of members of a test subject with apparatus which permits movement of each body member in only one plane, that is, the plane parallel to the body's plane of symmetry, and then inclining the test subject with respect to the vertical gravity vector so that the component of the gravity vector in the plane of movement is equal to the desired magnitude of the simulated reduced gravity. The basis for this technique is the observation that most of man's self-locomotive tests are performed with the body members moving in essentially parallel planes and the physical principle that the motion of a body moving along a plane inclined to the local gravity is affected by only the component of the gravity alined with the plane.

Thus, in the present invention a cable suspension system in which the test subject is supported by a series of body connections located at the head, upper torso, the buttocks, the calf of each leg and, when desired, each forearm just below the elbow, is employed to support the test subject at a desired inclination. The body supports, in turn, are suspended from an overhead trolley unit by a series of cables and a lightweight crossbar. The function of the crossbar is to support the several cables so that the subject can move the individual body members freely with respect to each other. The trolley unit is conveniently mounted on a stationary overhead monorail track which runs parallel to an inclined walkway used to simulate the surface of the body exhibiting a reduced gravitational field, such for example, the surface of the Moon or the floor of a rotating space station. The trolley unit is thus movable along the monorail by any conventional means in such manner that the cable system remains directly over the test subject as he moves along the walkway so as to eliminate the drag of the trolley unit on the subject.

Inclination of the test subject and consequently the magnitude of the reduced gravitational force simulated, is determined by the displacement of the walkway from directly beneath the trolley unit. The condition of zero gravity would be simulated if the subject is horizontal to Earth and the walkway is vertical and exactly beneath the trolley unit. This zero gravity condition would be due to absolute support of the test subject by the cable system. To produce the equivalent of the lunar gravity, or one-sixth G, an angle of about 80.5 degrees from the vertical is required for the inclined test subject, as will be further explained hereinafter.

A more complete appreciation of the invention and many of the attendant advantages thereof will be readily apparent as the same becomes better understood by reference to the following detailed description when considered in connection with the accompanying drawings wherein.

Figure 1:
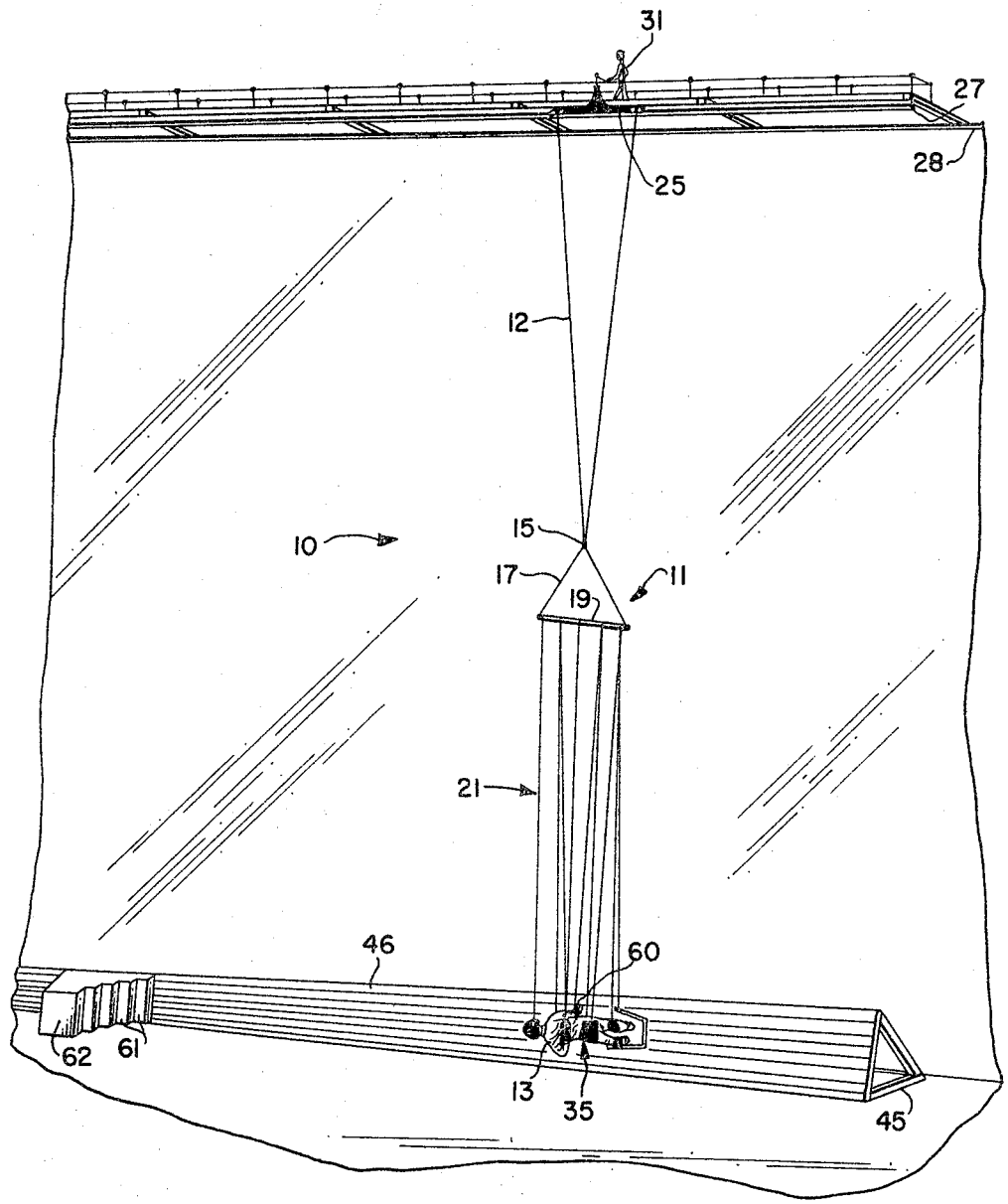
FIG. 1 is a schematic representation of the reduced gravity simulator according to the present invention employing a cable support system and inclined walkway for the test subject.

Referring now more particularly to the drawings, wherein like reference numerals designate identical parts throughout the several views, and more particularly to FIG. 1, there is shown a reduced gravity simulator 10 employing a cable suspension system generally designated by the reference numeral 11. Cable suspension system 11 is in connection at one end to a movable trolley unit 25 with the other end of the cable suspension system leading to a plurality of body harness support members, generally designated by reference numeral 35, for supporting a test subject 13. A walkway structure 45 is provided along a plane parallel with and angularly displaced with respect to a vertical plane passing through the plane of movement of trolley unit 25. Walkway structure 45 is provided with an inclined walkway surface 46 for test subject 13 to traverse, as will be further explained hereinafter.

Trolley 25 is disposed on a monorail track 27 and is adapted to move along track 25 by any conventional means, such for example under the influence of a separate operator 31, or through the use of conventional servo-mechanism, as test subject 13 executes movement in a plane along inclined walkway surface 46. Track 27 is fixedly attached in conventional manner to fixed accessible overhead structure 28 in such manner as to permit unimpeded movement of trolley 25 thereon.

Cable suspension system 11 includes primary support cable 12 connected at opposite ends thereof to opposite ends of trolley 25 and connected intermediate the ends thereof to an eye 15 secured to a yoke 17. The opposite ends of yoke 17 are attached in conventional manner to a lightweight crossbar 19. A plurality of secondary suspension cables, generally designated by reference numeral 21, extend from crossbar 19 and are connected in a conventional manner to harness-type individual body supports 35.

Figure 2:
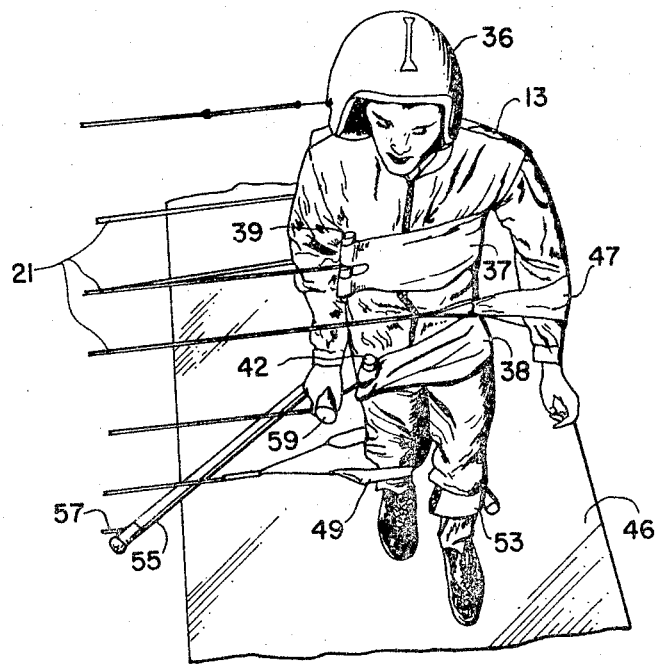
FIG. 2 is a perspective view of a test subject illustrating the slings and individual supports for individual body components when suspended in the cable suspension reduced gravity simulator as shown in FIG. 1.
Figure 3:
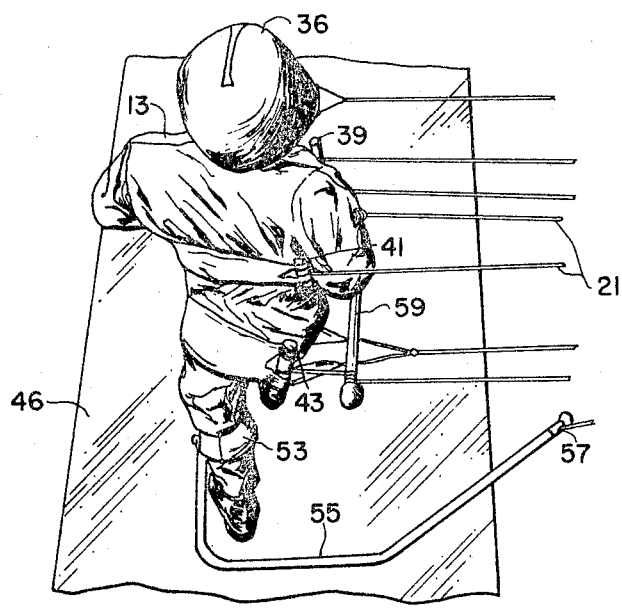
FIG. 3 is another view of test subject illustrating specialized supports for individual body components.

Referring now to FIG. 2 and FIG. 3, among the individual body supports to which secondary suspension cables 21 lead, is a protective helmet 36 strapped beneath the chin of test subject 13 for protection and support of the head. It is apparent that helmet 36 will bear against one side of the head of test subject 13 in such manner as to require the use of adequate conventional shock absorbing material, such for example, a heavy foam rubber liner.

Torso support of test subject 13 is provided by a chest sling 37 positioned beneath the armpit of the test subject, and a hip sling 38 passing essentially around the hip and buttocks of subject 13. The ends of sling 37 are secured in a conventional manner to a pair of lightweight rods, one of which is shown in FIG. 2 and designated by reference numeral 39, and the other of which is designated by reference numeral 41 and illustrated in FIG. 3. Rods 39 and 41 serve to attach sling 37 to secondary suspension cables 21. Hip sling 38 is also provided with a pair of rods 42 and 43 as shown in FIGS. 2 and 3, respectively, to connect hip sling 38 to the secondary suspension cables 21.

As is apparent from FIGS. 2 and 3, the invention as described is designed for test subject 13 to be positioned in the reduced gravity simulator with the left side of the body thereof adjacent the Earth's surface, although it is apparent that the system could obviously be designed in such a manner that the positions of the extremities of the test subject could be reversed.

Still referring to FIG. 2, the lowermost or left arm of test subject 13 is supported by arm sling 47 which is connected to secondary suspension cables 21 in a conventional manner. Also secured to secondary suspension cables 21 is a hand grasp rod 59 positioned in such manner as to be readily grasped by the uppermost or right hand of test subject 13 to provide selective support for this arm when desired during the test phase of the reduced gravity simulator system. As shown in FIG. 1, arm sling 60 may be employed for the right arm of test subject 13 in lieu of rod 59 when so desired.

The uppermost or right leg of test subject 13 is supported by secondary suspension cables 21 in a like manner by leg sling 49. Referring now more particularly to FIG. 3, the support for the left or lowermost leg of test subject 13 is provided by rod 55 and its attached strap 53. Strap 53 is tightly laced or otherwise conventionally secured about the calf of test subject 13. Rod 55 is angularly bent to pass behind test subject 13 to avoid obstructing test subject movement while also bent to permit attachment to secondary suspension cables 21 at a point directly above strap 53.

The individual slings and straps making up harness structure 35 may be formed of any conventional high tensile strength material, such for example canvas, or the like, and the individual cables may be of any conventional small diameter high tensile strength material.

As is apparent from the above description, test subject 13 when suspended as described is free to walk, run, jump, crawl as well as catch or lift loads of various size, shape or bulk that may be positioned in his path of movement along walkway surface 46. In handling these loads, for example, the loads could be suspended from the same trolley unit 25 or an additional unit by another cable system so as to be subjected to the same gravity condition as test subject 13. Walkway surface 46 also may be equipped with ladders, slopes or any other simulated lunar or other surface or space station features, not shown, in addition to or in lieu of stairs 61, for individual specialized tests for test subject 13, when so desired. As is also apparent from the above description, harness structure 35 is not required to be of specific dimensions for different size test subjects and due to the simplicity of construction thereof the system is readily adaptable for use by various size individuals alone, as well as when equipped with space suits, rocket jump packs or other pieces of equipment to evaluate their performance for effectiveness, within the teachings of the present invention.

Referring now back to FIG. 1, the practical limits for the horizontal distance to be covered by walkway structure 45 and track 27 are indicated only by the practical conditions such as the size of the available room or facility for carrying out the test. It is apparent, however, that the vertical distance a person is capable of reacting in a jump on the Moon may be assumed to be equal to the ratio of the Earth gravity to lunar gravity, times the distance the subject is able to reach on the Earth gravity. Tests have shown that a person is capable of jumping an average of about 20 to 22 inches from his standing position on Earth, consequently provisions must be made in the simulation equipment for at least six times this vertical distance, or at least ten to twelve feet. Additionally, walking or running being the primary test to be undertaken in this simulator, horizontal distances of several hundred feet for walkway structure 45 and track 27 are desirable to permit adequate time for the test subject to accelerate to a running pace and to decelerate to a standstill. Based on the assumed maximum running speed of twenty feet-per-second, the minimum distance to undergo an adequate running test would be about one hundred and fifty feet for walkway structure 45 and track 27.

The lengths of the various cables 12, 17, and 21 are adjusted so that test subject 13 can stand with a normal, erect posture on inclined walkway surface 46. The use of the multiple cables 21 permit body members to move freely in essentially parallel planes as mentioned hereinbefore. Cables 12 and 21 are made as long as it is possible to design the system to minimize the slight out-of-plane movement that is generated as the cables pivot about the fixed attachment points thereof at cross-bar 19. The trolley 25 on track 27 permits the whole suspension system to be moved by test operator 31, or other mechanism, so that the cables remain essentially directly overhead as the test subject moves back and forth along walkway surface 46 to thereby eliminate any fore and aft drag on the subject.

Figure 6:
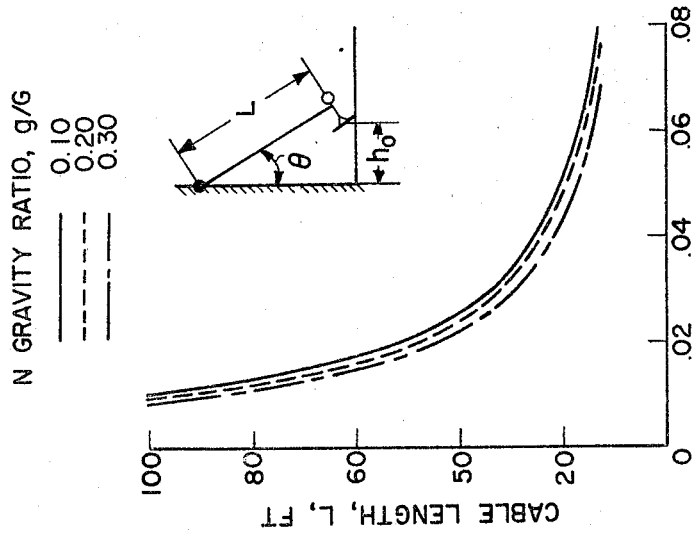
FIG. 6 is a graphic representation of the affect an increasing cable length has on the gravity gradient for various gravity ratios.

Inclination of test subject 13, as mentioned hereinbefore, is facilitated by displacing walkway structure 45 angularly with respect to a vertical plane passing through the parallel track 27. The required distance for this displacement may be calibrated as a function of the magnitude of the simulated gravity in terms of the gravity ratio, i.e., the ratio of simulated gravity "g" to Earth gravity "G" for different suspension cable lengths. In addition, as illustrated in FIG. 6, the gravity gradient in terms of change of gravity ratio per foot elevation varies with the length of the suspension cable system 11. This gradient, which is experienced by the test subject 13 as he leaps from walkway surface 46 or changes his apparent elevation by climbing steps 61 or the like, is produced by the changing angle of the suspension cable system 11 whose attachment point is fixed in the one direction by trolley 25. Thus, by using cable lengths of fifty feet or greater, the gradient can be effectively minimized.

Figure 4:
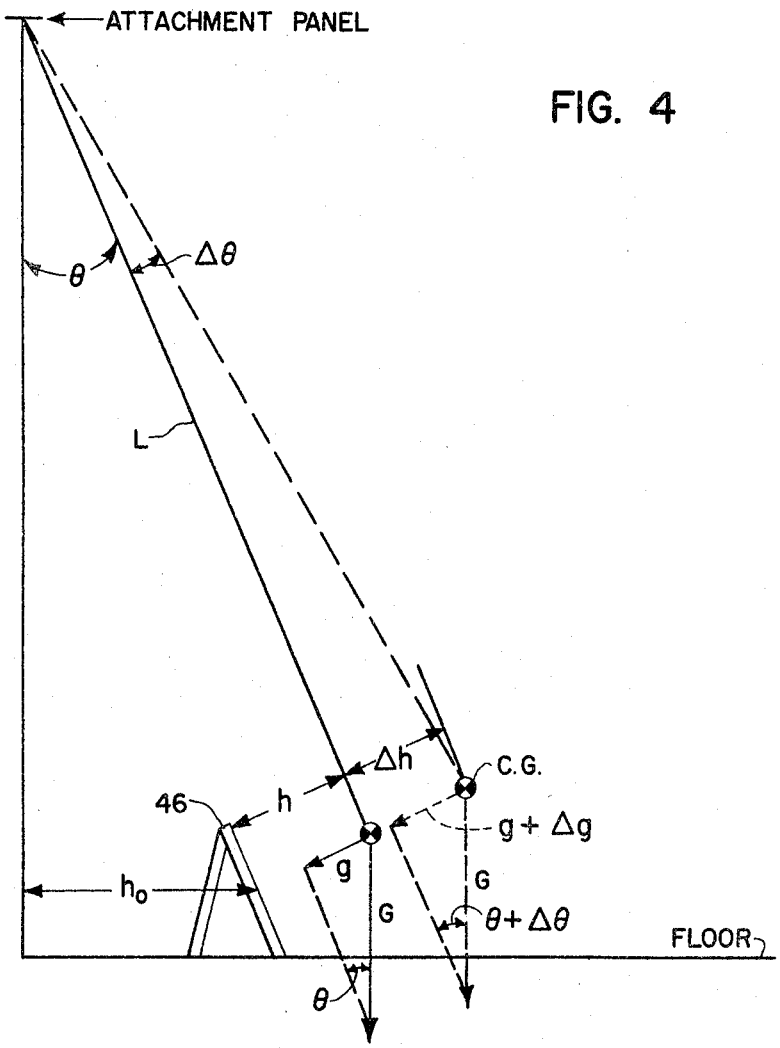
FIG. 4 is a schematic representation of the geometric relationships for the cable suspension system of the reduced gravity simulator according to the present invention.

The variables to be considered when determining walkway displacement and gravity gradients for a particular system are illustrated in FIG. 4, wherein it is evident that the inclination angle $\theta$ between the suspension cable and the vertical required to produce a given simulated gravity acting on the test subject standing on walkway 45 is given by the following equation:

$$g = G \sin \theta$$

or $$\theta = \sin^{-1}\left(\frac{g}{G}\right) = \sin^{-1} N \tag{1}$$

when N is the ratio of the desired simulated gravity "g" to the Earth gravity "G." From this expression, it is readily apparent that a one-sixth Earth gravity, or lunar gravity, would be obtained when $\theta$ is 9.5 degrees to thereby position test subject 80.5 degrees to the vertical of the Earth gravity vector. The displacement "$h_0$" of the walkway, measured parallel to the floor required to produce the necessary cable angle, is given by the following equation:

$$h_0 = L \sin \theta - h \cos \theta \tag{2}$$

where L is the suspension cable length taken from the upper cable attachment point to the test subject's center of gravity and "$h$" is the distance between the subject's center of gravity and soles of his feet. For purposes of illustration, the value of "$h$" may be taken to be equal to 3.5 feet. Combining Equations 1 and 2, the equation for "$h$" in terms of N is:

$$h_0 = LN - h \cos(\sin^{-1} N) \tag{3}$$

Figure 5:
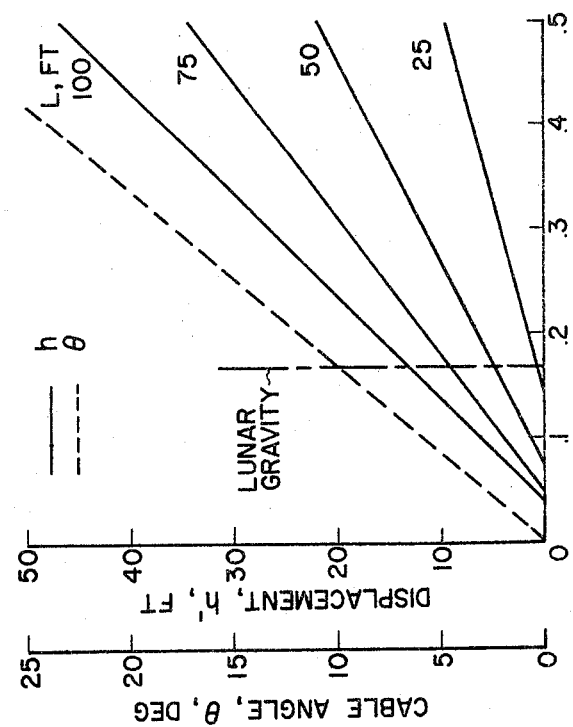
FIG. 5 is a graphic representation of cable angle and walkway displacement required for different gravity ratios and varying cable lengths.

Curves showing the variations of $\theta$ and "$h_0$" with the gravity ratio N as expressed by these equations are illustrated in FIG. 5.

Referring now back to FIG. 4, the gravity component "g" acting on the test subject is seen to increase by an amount $\Delta g$ as the subject is displaced from the walkway by an amount $\Delta h$ during a jump or while climbing steps 61, or the like, due to the change $\Delta \theta$ in the cable angle, according to the following relationship:

$$(g+\Delta g) = G \sin(\theta + \Delta\theta) \quad (4)$$

where the value of $\Delta\theta$ is found as follows:

$$\Delta\theta = \sin^{-1}\left(\frac{\Delta h}{L}\right)$$

or $$\sin \Delta\theta = \frac{\Delta h}{L} \quad (5)$$

The value of $\Delta g$ is obtained by subtracting Equation 1 from Equation 5:

$$\Delta g = G[\sin(\theta + \Delta\theta) - \sin\theta]$$

or $$\Delta g = G[\sin\theta \cos\Delta\theta + \sin\Delta\theta \cos\theta - \sin\theta] \quad (6)$$

If it is assumed that $\Delta\theta$ is small, then $\sin\Delta\theta \approx \theta$ and $\cos\Delta\theta \approx 1$ and Equations 5 and 6 can be combined and simplified to yield the following:

$$\Delta g = G\frac{\Delta h}{L}\cos\theta$$

or $$\frac{\Delta N}{\Delta h} = \frac{\cos\theta}{L} \quad (7)$$

where $$\Delta N = \frac{\Delta g}{G}$$

Curves showing the variation of the gravity of the gradient factor with cable length for different values of the gravity ratio N are shown in FIG. 6. As is apparent from FIG. 6, the gravity gradient factor is minimized when the cable length is at a maximum with lengths of at least fifty feet being desirable.

*Corrections for jumping heights*

Inasmuch as a cable suspension system of the present invention produces an increase in the simulated gravity as the height of the test subject above walkway 45 is increased, it is necessary to apply corrections to the measured jumping heights obtained by the test subject in order to determine the actual heights that would be obtained under conditions of constant acceleration. Equations for applying these corrections are readily available, as is apparent to those skilled in the art.

Average maximum heights of 8 to 9 feet were attained by different test subjects when jumping from walkway 45 in the presently described reduced gravity simulator. Application of height corrections to account for the gravity gradient produced by the test apparatus showed that heights of 12 to 14 feet could thus be achieved under conditions of constant lunar gravity. These maximum heights would be expected to vary when the test subject is attired in a bulky space suit. In addition, the individual test subjects observed in the reduced gravity simulator described the sensation of walking and running along walkway surface 46 as comparable to that of trying to run or walk on a highly polished floor or ice. This observation indicates that the use of high friction producing sole material for the footwear of lunar explorers would probably be essential since the low foot traction would be recognized as a safety hazard making it difficult for the explorer to shift his position rapidly to avoid being struck by moving or falling objects or to gain sure footing or hand holds while in a precarious position.

Another interesting observation noted by each test subject when attempting to walk up steps 61 (FIG. 1) to landing 62 revealed that, although there was no serious problem in climbing the stairs under the condition of lunar gravity, it was far simpler and required less concentration, merely to jump from the walkway surface 46 to landing 62, a vertical distance of about four feet. This test suggests the possibility that the normally accepted riser and tread dimensions for stairways should be altered for use in the design of lunar base housing.

It is thus seen that the present invention utilizing various and inexpensive cable suspension equipment for the inclined plane technique of reduced gravity simulation is a practical and useful apparatus for familiarizing lunar mission personnel with their capabilities and sensations while under the influence of lunar gravity. Since this system can provide essentially unlimited duration of the testing period and is adequate for performing most of the modes of self-locomotion, the evaluation of the various forms of man's self-locomotion including the range in duration limits of man's walking and running on the lunar surface, as well as his ability to carry various amounts of equipment or loads can adequately be predicted and observed prior to undertaking of the actual lunar mission. Also, it is obvious that this system may be employed as an aid in design and development of practical space suits for lunar exploration as well as in the design and development of lunar base housing and space station features.

Obviously, many modifications and variations of the above invention are possible in the light of the above teachings. For example, the test subject could be supported by an articulated support frame which is provided with air bearing feet so that the frame could slide freely over the floor of a special room. This special room could then be tilted so that the floor is inclined to the desired angle with one wall thereof being painted to represent the walking surface. The floor of this room could be covered with a mirrored surface so as to give an illusion of standing in the middle of the walking surface, the subject's reflected image not being seen by the subject because of his restricted field of vision. Thus, by tilting this specially equipped room at an angle of 9.5 degrees, the test subject could be positioned 80.5 degrees to the vertical and simulation of the lunar gravity would be achieved for the individual test subject. An additional embodiment or modification of the present invention would be the use of a cable suspension system but without the trolley and track system described herein. In this modification the cable system would be attached to a fixed overhead suspension point through a suitable unit so that the cable could rotate at the attachment point and a circular inclined walkway being employed in lieu of walkway structure 45. The radius of the circular walkway for a given cable length in this modification would obviously determine the magnitude of the simulated gravity, with maximum cable length minimizing the problems caused by the curvature of the walkway. Also another apparent modification in each of the above described arrangements would be the substitution, or addition of, a treadmill device for the fixed walkway in each arrangement.

In addition to the uses described herein for the present invention, it will be readily apparent to those skilled in the art that this invention could find obvious utility in design and study of landing gears and locomotive devices for lunar vehicles and other spacecraft, and could possibly find commercial utility as an amusement device for recreation and in amusement parks.

In view of these and other obvious modifications and variations apparent to those skilled in the art, it is to be understood that within the scope of the appended claims the invention described herein may be practiced otherwise than as specifically claimed herein.

What is claimed as new and desired to be secured by Letters Patent of the United States is:

1. An apparatus for simulating a reduced gravity condition for a test subject, comprising: an inclined walkway of predetermined length, a track parallel to and positioned angularly a distance above said walkway, a trolley movable along said track, a cable system extending from said trolley, said cable system including,
a primary cable extending from said trolley,
a lightweight crossbar connected to said primary cable,
a plurality of secondary cables connected to and extending from said crossbar, support means for the test subject connected to said cable system,
said support means including a plurality of individual body engaging supports for various portions of the test subject's body with each individual member thereof being secured to individual members of said secondary cables, and said support means being so constructed and arranged as to permit planar self-locomotive movement of the test subject along said inclined walkway to thereby test his actions and reactions to reduced gravity conditions.

2. Apparatus for simulating a reduced gravity condition for a test subject comprising:
a horizontal track positioned on a fixed overhead structure,
a trolley movable along said track,
a primary cable extending from beneath said trolley,
a lightweight crossbar connected to the end of said primary cable,
a plurality of secondary cables connected to and extending from said crossbar,
support means for a test subject connected to each of said secondary cables,
a horizontal walkway traversible by the test subject and inclined with respect to the vertical gravity vector of Earth so that the component of the gravity vector in the plane of subject movement along said walkway is equal to the desired magnitude of the simulated reduced gravity,
said support means being so constructed and arranged as to permit planar locomotion of the test subject along said walkway when supported thereby.

3. A system for simulating one-sixth gravity condition for a test subject, comprising:
an inclined walkway of predetermined length,
a track parallel to and angularly positioned a distance above said walkway,
a trolley movable along said track,
a primary cable extending from said trolley,
a lightweight crossbar connected to the end of said primary cable,
a plurality of secondary cables connected to and extending from said crossbar,
a plurality of supports for the test subject connected individually to said secondary cables,
said supports and cables being so constructed and arranged as to effectively support five-sixths of the weight of said test subject and permit movement of the test subject along said walkway under a simulated one-sixth gravitational effect.

4. A reduced gravity simulator for a test subject, comprising:
an inclined plane walkway for the test subject,
a fixed track being parallel to and disposed angularly a vertical distance from said inclined walkway,
a movable trolley disposed upon said fixed track,
suspension means for partially supporting the weight of said test subject,
said suspension means including a plurality of elements to engage the extremities, torso, and head of said test subject,
each of said elements being connected to individual cables,
said individual cable being attached to a crossbar a distance from said test subject,
a yoke connected to and extending from said crossbar,
a primary cable leading from said yoke and secured to opposite ends of said movable trolley,
whereby said test subject while in partially supported condition may perform locomotive tasks along the plane of said walkway under simulated reduced gravitational conditions.

5. A reduced gravity simulator, comprising:
a trolley adapted to move along an overhead track,
a cable system secured to said trolley and movable therewith,
said cable system terminating in a harness structure,
said harness structure being so constructed and arranged as to support the extremities, torso, and head of an occupant,
a walkway surface so positioned as to permit occupant movement thereon by the harnessed occupant,
said walkway surface being on an inclined plane relative to the Earth's surface and at a selected distance from directly beneath said trolley whereby,
a portion of the occupant's weight will be supported by the cable system with the remaining portion thereof supported by the inclined walkway to thereby simulate a reduced gravitational effect on movement by said occupant.

6. A reduced gravity simulator for a test subject, comprising:
an inclined plane walkway for the test subject so constructed and arranged to simulate a surface gravitational field less than that of the Earth's surface,
cable means for partially supporting the weight of said test subject so as to nullify a portion of the normal vertical gravity vector,
a plurality of elements to engage the head, torso, and extremities of said test subject, said plurality of elements each being connected to one end of said cable means,
means for securing the other end of said cable means angularly a distance above said walkway,
whereby said test subject while in partially supported condition may perform locomotive tasks along the plane of said walkway under simulated reduced gravitational conditions.

7. A reduced gravity simulator as in claim 6 wherein said plurality of elements include:
a protective helmet adapted to be strapped beneath the chin of the test subject,
a first body sling positionable beneath an armpit of the test subject and attached at opposite ends thereof to said cable means,
a second body sling positionable about the hip and buttocks of the test subject and attached at opposite ends thereof to said cable means,
a leg strap adapted to be tightly secured around the calf of one leg of the test subject,
an angular rod in connection at one end thereof with said leg strap and connected at the other end thereof to said cable means,
a leg sling positionable about the calf of the other leg of the test subject,
said leg sling being attached at opposite ends thereof to said cable means, and
supports for the arms of the test subject also in connection with said cable means.

8. A reduced gravity simulator as in claim 7 wherein said supports for the arms include:
an arm sling positionable about one forearm of the test subject,
said arm sling being in connection at opposite ends thereof to said cable means, and
means providing selective support for the other arm of the test subject.

9. A reduced gravity simulator as in claim 8 wherein said means providing selective support for the other arm of the test subject includes:
a hand grasp rod secured at opposite ends thereof to said cable means and so constructed and arranged as to be selectively grasped by the test subject to provide support for said other arm.

10. A reduced gravity simulator as in claim 7 wherein said supports for the arms are arm slings positionable about each forearm of the test subject.

11. A system for use in combination with a test subject on Earth to simulate a gravity condition for said test subject less than one G, comprising:

fixed track means for supporting a movable trolley, a trolley movable along said track means, body engaging support means for a test subject, cable means secured at one end thereof to said body engaging support means, the other end of said cable means being secured to said trolley, said trolley being vertically spaced from said body engaging means at a predetermined angle thereto, a walking structure for said test subject disposed adjacent said body support means, said walkway structure being parallel with and displaced angularly with respect to a vertical plane passing through the plane of movement of said trolley, an inclined surface on said walkway structure as to permit movement thereon by said test subject when said test subject is supported by said support means, said trolley being simultaneously movable along said track means when said test subject moves along said inclined walkway.

12. A reduced gravity simulator comprising:

means for supporting a test subject in a nearly horizontal attitude, said means being connected at one end to an overhead trolley and track system, an inclined walkway positioned parallel with said track system adapted to be traversed by said test subject, said means for supporting the test subject permitting the individual appendages of the test subject to be moved freely in essentially parallel planes to thereby permit substantially normal self-locomotive movement along said inclined walkway, said inclined walkway being displaced a predetermined distance from directly beneath said track system in such manner that only a portion of said test subject's weight is directed onto said inclined walkway with the remaining portion thereof being supported by said support means.

13. A reduced gravity simulator as in claim 12 wherein said inclined walkway is at such an angle with respect to the vertical gravity vector so that the component of the gravity vector of a test subject in the plane of movement therealong is substantially equal to one-sixth Earth gravity to thereby simulate the gravitational condition anticipated on the lunar surface.

14. A reduced gravity simulator for testing the self-locomotive capabilities of a test subject when subjected to a gravitational condition less than that of the Earth, comprising:

a support system including individual and separate means for supporting the individual extremities, head and torso of a test subject, means for inclining the test subject in a predetermined inclination plane with respect to the vertical gravity vector, means permitting self-locomotion of the test subject and including the individual extremities thereof in essentially parallel planes normal to the inclination plane of the test subject when inclined, and means permitting simultaneous movement of said support system along a plane parallel to said test subject as said test subject moves along said inclined plane, whereby the component of the gravity vector in the plane of subject movement is equal to the desired magnitude of a simulated reduced gravity.

References Cited by the Examiner

UNITED STATES PATENTS

| | | | |
|---|---|---|---|
| 1,409,702 | 3/1922 | Gill | 182—3 |
| 1,427,453 | 8/1922 | Fleming | 182—36 |
| 2,195,299 | 3/1940 | Frankel | 182—3 X |
| 2,930,145 | 3/1960 | Green | 35—29 |
| 3,099,331 | 7/1963 | Rose | 182—3 |
| 3,161,968 | 12/1964 | De Boy et al. | 35—12 |

FOREIGN PATENTS

| | | |
|---|---|---|
| 379,387 | 8/1923 | Germany. |
| 451,396 | 10/1927 | Germany. |

EUGENE R. CAPOZIO, *Primary Examiner.*

JEROME SCHNALL, *Examiner.*

HARLAND S. SKOGQUIST, *Assistant Examiner.*